J. D. KYLE.
METHOD OF MAKING DECORATED GLASS.
APPLICATION FILED NOV. 15, 1906.

914,734.

Patented Mar. 9, 1909.

WITNESSES.
M. A. Keller.
Robert C. Totten.

INVENTOR.
Joseph D. Kyle
By Kay Totten & Winter
attorneys

UNITED STATES PATENT OFFICE.

JOSEPH D. KYLE, OF SWISSVALE, PENNSYLVANIA, ASSIGNOR OF ONE-HALF TO SARAH E. KYLE, OF SWISSVALE, PENNSYLVANIA, AND ONE-FOURTH TO C. A. WARMCASTLE AND ONE-FOURTH TO H. S. RICHARDS, OF PITTSBURG, PENNSYLVANIA.

METHOD OF MAKING DECORATED GLASS.

No. 914,734.      Specification of Letters Patent.      Patented March 9, 1909.

Application filed November 15, 1906. Serial No. 343,584.

*To all whom it may concern:*

Be it known that I, JOSEPH D. KYLE, a resident of Swissvale, in the county of Allegheny and State of Pennsylvania, have invented a new and useful Improvement in Methods of Making Decorated Glass; and I do hereby declare the following to be a full, clear, and exact description thereof.

My invention relates to a method of making decorated glass.

The object of my invention is to provide a method of securing the raised lines which form the outlines of the design upon the glass in such manner that they are substantially part and parcel of the glass and will not be liable to crack or spall off when subjected to changes in temperature or the action of frost.

To these ends my invention consists, generally stated, in depositing the raised lines upon the surface of the glass composed of a plastic substance fusible with glass, and then firing the glass to fuse said lines with the glass and make them substantially a constituent part thereof. The colors may be applied to the areas inclosed by said lines before the firing so as to be burned in at the same time or the colors may be burned in afterward if desired.

Figure 1:
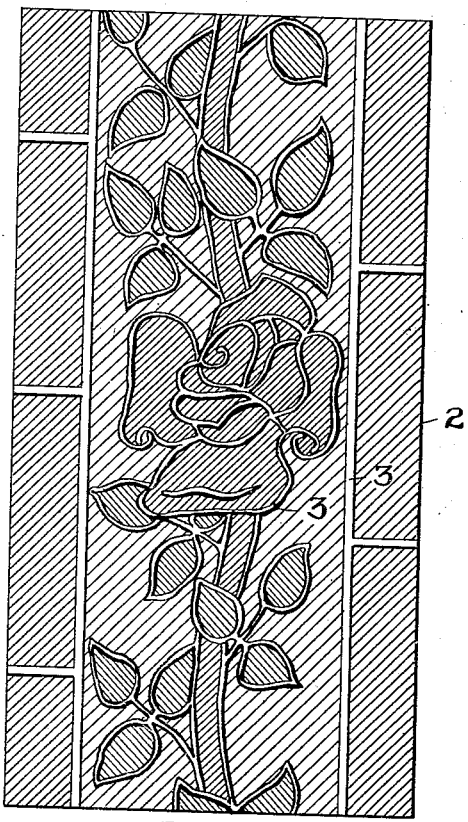
Figure 2:
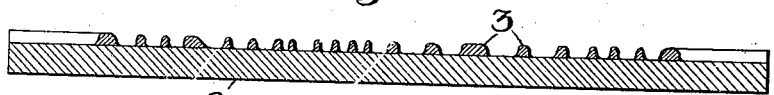
Figure 3:
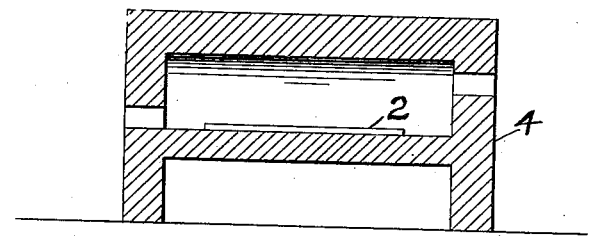
Figure 4:

In the accompanying drawing Figure 1 is a plan view of a decorated glass panel made in accordance with my invention; Fig. 2 is a cross-section of a panel before it is fired; Fig. 3 is a section of a suitable kiln; and Fig. 4 is a cross section of the finished glass.

In practicing my invention I take iron ore, such as red hematite, and reduce it to powdered form. Before using the iron ore I prefer to expel the gases therefrom so as to prevent the formation of bubbles or cracks when the firing operation takes place as hereinafter set forth. Accordingly, I take the powdered ore and placing it on a tray or slab insert it into a suitable furnace or firing kiln heated to a sufficient temperature to burn out the gases contained in the ore. This iron ore so treated and in powdered form is mixed with suitable quantities of glass-flux and ground asbestos. To be more exact as to proportions of the above ingredients, I make up the composition of one-half iron-ore, one-fourth glass-flux, and one-fourth ground asbestos. This composition is reduced to a plastic condition by adding fat-oil and turpentine with a small portion of gum arabic and oil of copaiba, the gum and oil having the effect of preventing the composition from drying out and making it more elastic before it is applied to the glass. I may employ fat-oil of turpentine if desired.

The composition when brought to the proper consistency is ready to be applied to the surface of the glass and to do this conveniently it may be introduced into a bulb or sack which is connected up to an ordinary baker's tube. By squeezing the bulb or sack the plastic composition is discharged from the tube in a continuous line of proper dimensions. The outlines of the design are drawn on the glass panel 2 by depositing the plastic material to form the raised lines 3. After the lines have been drawn in this manner the colors are applied to the surface of the glass in the spaces inclosed by the lines. Glass colors are employed for this purpose so as to withstand the firing to which the glass is subjected. The glass with the lines formed thereon and the colors applied thereto is then introduced into a suitable oven or kiln 4 and fired. The temperature of the kiln is such as to cause a fusion between the lines 3 and the glass, so that the lines become substantially a constituent part of the glass, as shown in Fig. 4. At the same time the glass colors are fired and become permanently fixed on the surface of the glass. If desired the lines may be fired before the colors are applied and afterward the colors applied and the glass subjected to a second firing. The design in colors might first be applied to the glass by stencil indicating the position of the lines, and the lines then deposited by following the outlines as indicated by the stencil. This would do away with the necessity of applying the colors by hand after the lines are formed and would cheapen the product. When the lines and colors are finally fixed by the firing they will be found to be so permanent in character as not to be affected by sudden changes of temperature or when exposed as in the case of windows to the inclemency of the weather. By the fusion of the lines with the glass there is no liability of the cracking or spalling of the lines due to frost or cold and the glass retains its original beauty of design and color.

By the employment of a composition for the lines which will withstand the intense heat of the firing I obtain a fusion which gives the lines their permanency.

I do not wish to limit myself to the exact method herein described, as it may be varied or the ingredients changed and equivalents substituted therefor without departing from the spirit of my invention. Furthermore, my invention is not confined to glass to be colored, as the lines may be deposited in imitation of leaded glass as well as other designs where colors are not employed.

What I claim is:

1. The process of making decorated glass, consisting in depositing raised lines of plastic material on a glass surface, firing the glass, and fusing the lines therewith.

2. The process of making decorated glass, consisting in depositing raised lines of plastic material on a glass surface, applying colors to the glass, firing the glass, and fusing the lines therewith.

3. The process of making decorated glass, consisting in depositing raised lines of a fusible material on said glass, and then firing same to cause fusion.

4. The process of making decorated glass, consisting in depositing raised lines of plastic material on a glass surface, and creating fusion between said lines and said glass.

5. As a new product of manufacture, glass having raised lines thereon of a different material fused with the glass.

6. As a new product of manufacture, glass having raised lines thereon containing iron ore fused with the glass.

In testimony whereof, I the said JOSEPH D. KYLE have hereunto set my hand.

JOSEPH D. KYLE.

Witnesses:
ROBERT C. TOTTEN,
JOHN F. WILL.